United States Patent [19]

Foster

[11] 4,136,310

[45] Jan. 23, 1979

[54] AUTOMATIC ELECTRIC BATTERY CHARGING APPARATUS

[75] Inventor: George W. Foster, Bolton, England

[73] Assignee: Chloride Group Limited, London, England

[21] Appl. No.: 777,462

[22] Filed: Mar. 14, 1977

[30] Foreign Application Priority Data

Mar. 17, 1976 [GB] United Kingdom ............... 10604/76

[51] Int. Cl.² ............................................. H02J 7/04
[52] U.S. Cl. ........................................ 320/37; 320/39
[58] Field of Search .................................... 320/22–24, 320/37, 38, 39, 40

[56] References Cited

U.S. PATENT DOCUMENTS

| | | | |
|---|---|---|---|
| 3,886,427 | 5/1975 | Long | 320/22 |
| 4,016,474 | 4/1977 | Mason | 320/38 X |

Primary Examiner—Robert J. Hickey

Attorney, Agent, or Firm—Watson, Cole, Grindle & Watson

[57] ABSTRACT

A controller for incorporation in a battery charger to limit the overall length of the charge, and also to provide short topping-up charges at intervals after the main charge has been completed, if the battery is left connected to the charger. The controller allows the limit on the length of the charge to be set to either 10 or 14½ hours; the subsequent topping-up charges then start at intervals for 10 or 14½ hours, and last for about 40 or about 55 minutes, depending on the setting of the main charge time limit. The controller is illustrated in conjunction with a charger control circuit which terminates the main charge when the rate of rise of battery voltage falls below a predetermined value, and this is normally expected to occur before 10 (or 14½) hours have elapsed, leaving the time limit set by the controller as a safeguard.

10 Claims, 1 Drawing Figure

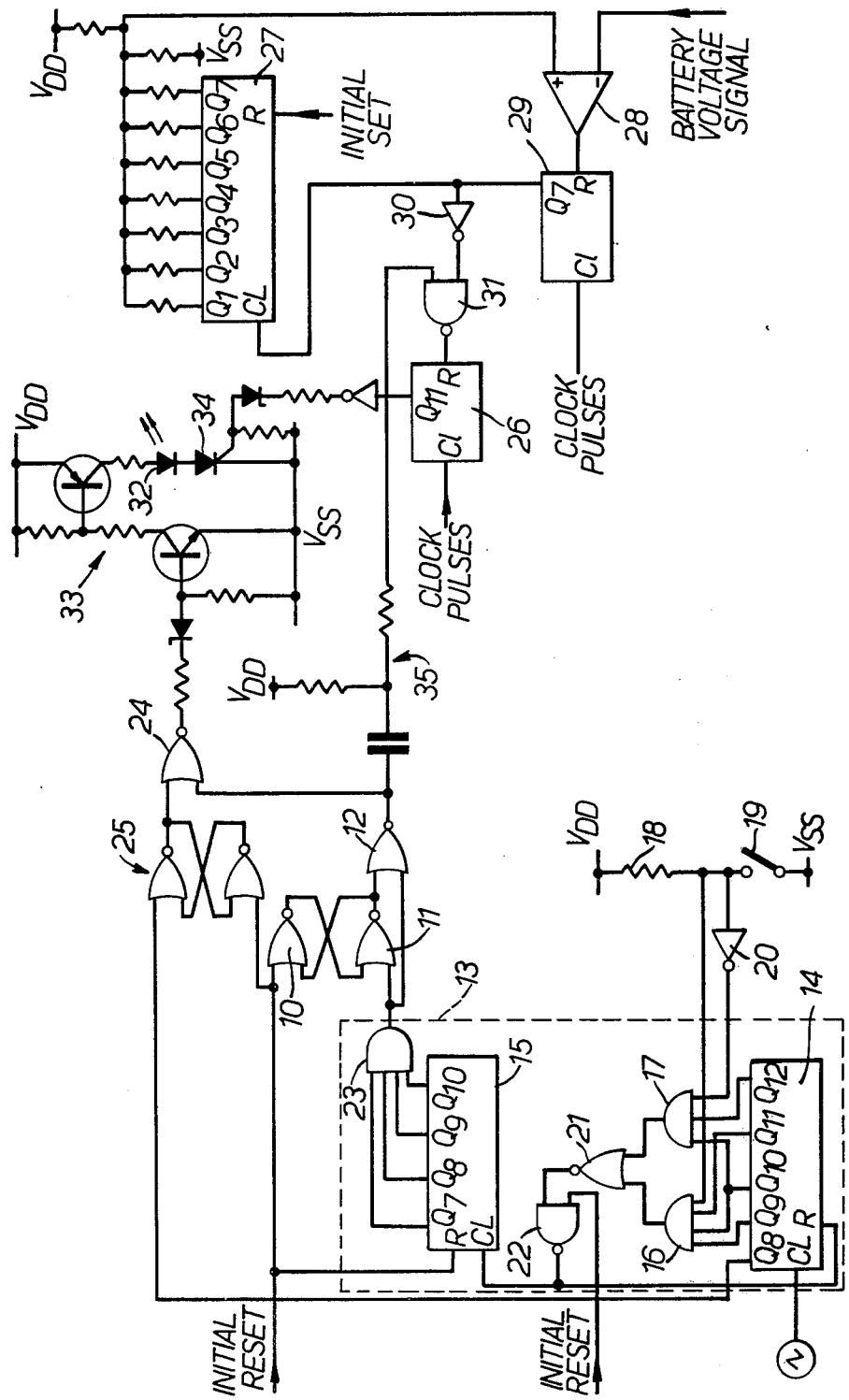

AUTOMATIC ELECTRIC BATTERY CHARGING APPARATUS

This invention relates to electric battery chargers and is concerned with the provision of apparatus for supervising the switching off of an electric battery charger. The invention is particularly though not exclusively concerned with such apparatus for supervising an automatic battery charger to perform two functions. Firstly it provides an additional safeguard for an automatic charger provided with means for switching off the charging current automatically when the battery is fully charged, to ensure that if such apparatus should fail to function the supervising apparatus will switch off the charging current after a certain maximum time. Secondly the supervising apparatus will thereafter switch on the charging current for short periods at comparatively long intervals in order to give a topping up charge if the battery is left connected to the charger after the main charge has been completed, for example during a weekend or a holiday period.

According to the present invention apparatus for supervising the switching off of an electric battery charger and providing a topping up charge includes a clock programmer giving digital signals for long periods and short periods alternately, a bistable latch having set and reset inputs, of which the set input is connected to the programmer output to force the latch into its set condition during the said short periods, and the reset input is connected to a source of an initial reset signal, and a gate connected to be controlled by the programmer output and by the latch and to control the switching on and off of charging current, the gate switching on the charging current when either the latch is in its reset condition or the programmer is providing a set signal to the latch, so that the said charging current will be allowed to be switched on, because the latch is reset, during a first long period at the end of which the latch will be set, without switching off the charging current until the end of the ensuing short period, and at the end of each subsequent long period the charging current will be switched on again, and at the end of each subsequent short period it will be switched off again.

It will be appreciated that the terms set and reset are used herein arbitrarily as far as the bistable circuit itself is concerned, as either state of the latter can be regarded as the set state provided the the term is used consistently. The latch may take one of several forms, such as a pair of NOR gates or a pair of NAND gates.

Preferably the programmer comprises a binary digital counter connected to a source of clock pulses and having an AND gate arrangement with inputs connected to a number of selected consecutive count outputs of the counter and its output connected to provide the programmer output, so as to switch on at the end of a long period when the counter reaches a one count on all the selected outputs with zero on all lower outputs, and switch off at the end of an ensuing short period, when, after reaching a one count on all the said lower outputs as well as the selected outputs it resets all the selected outputs as well as lower outputs to zero, thereafter repeating similar long and short intervals. The selected count outputs should be consecutive (e.g. Q7, Q8, Q9 and Q10) so that they remain unchanged while the lower stages (e.g. Q1 to Q6) are filling up, i.e. progressing to the 1 states.

In one form of the invention the programmer binary counter is supplied with clock pulses from an alternating current supply through a frequency divider comprising a binary digital counter giving an output and resetting itself when it reaches a predetermined count.

It may be desirable to provide for adjustment of the long and short periods to suit batteries and charger designed to effect a main charge in different periods. Thus for example if the main charge is intended to be effected in say 12 hours the initial safeguard period comprising the first long and short periods may be about 14½ hours whereas if the charge is intended to last 8 hours the initial safeguard period may be about 10 hours. This is conveniently effected by providing switching means for altering the count of the frequency divider counter at which it supplies a clock pulse to the programmer counter and resets itself. The circuit may include a pair of AND gates each having one or more inputs connected to count outputs for the frequency divider counter and an input connected to a switch circuit, the latter input of one gate being connected directly to the switch circuit whilst that of the other is connected thereto through an inverter so that with the switch in one position one gate is enabled and the other is inhibited and vice versa. The outputs of the AND gates may be connected to the clock input of the programmer counter through a NOR gate or the equivalent.

Further features and details of the invention will be apparent from the following description of one specific embodiment, taken in conjunction with the accompanying drawing, which is a circuit diagram of the relevant parts of the embodiment.

The embodiment to be described is primarily designed for use with an automatic electric battery charger as described in co-pending U.S. application Ser. No. 775,553, filed Mar. 8, 1977. In this charger the magnitude of the charging current is adjusted throughout the charge so as to fall in accordance with a function of the rise of battery voltage. For this purpose a reference voltage is compared with a signal dependent on battery voltage and is increased by a step and the current reduced by a step whenever the said signal exceeds the reference voltage. The charging current is switched off when the time between steps exceeds a predetermined value. Thyristors are relied upon both to control the magnitude of the current during the charge, and to switch off the charging current at the end of it.

The auxiliary circuit in accordance with the present invention controls the same thryristors so as in the first place to provide a safeguard to ensure that if the charger should fail to switch off the charging current when the battery is fully charged the period of additional charging will be limited to a maximum overall time. Secondly the apparatus provides for a topping up charge at intervals if the battery should be left connected to the automatic charger after it has been fully charged, for example during holidays or weekends.

The auxiliary apparatus comprises a cross connected NOR gate latch consisting of two 2-input NOR gates 10 and 11 each having its output connected to a first input of the companion gate. The remaining inputs of the gates 10 and 11 form, respectively, the 'reset' and 'set' inputs to the latch. For example if a '1' signal is applied to the 'reset' input of the gate 10, while a '0' signal is applied to the 'set' input of the gate 11, the output of the gate 10 will become '0', while the output of the gate 11 will become '1'. Because the '1' output of the gate 11 is applied to the first input of the gate 10, the outputs of the gates will not change, even if the 'reset' input changes to '0', so that both inputs to the latch are '0'. Conversely, a '1' input on the 'set' input of the gate 11 will produce '1' and '0' outputs from the gates 10 and 11 respectively, and these states will persist even if both inputs to the latch become '0'. In other words, when both inputs are '0', the latch is bistable and retains its previous state.

A third NOR gate 12 has a first input connected to the output of the NOR gate 11, and a second input connected, together with the 'set' input of the NOR gate 11, to the output of a programmer unit 13. The 'reset' input of the NOR gate 10 is connected to the main charger to receive from it a resetting pulse to reset the latch initially, so that the gate 11 initially gives a '1' output.

The programmer unit 13, as described in more detail below, serves to provide digital signals for long periods and short periods alternately; for example, the long periods may be about 13½ hours and the short periods about 1 hour each.

The output of the NOR gate 12 is connected to control the switching on and off of the charging current, a 1 output switching off the charger and a 0 output switching it on.

The operation is as follows:

First the latch is initially reset by the application of a 1 for a short period to the second input of the gate 10.

The resetting pulse is also applied to the programmer unit 13, and resets it so that it is at the start of one of the long timing periods. At the end of the first long period the programmer unit 13 will deliver a 1 to the 'set' input of the latch gate 11 to change the state of the latch 10, 11. This means that the first input of the gate 12 is at 0 but since the second input is for the moment at 1 the output will remain at 0.

At the end of the first short period the programmer unit 13 delivers a 0 to the second input of the gate 12 thereby producing an output of 1 which switches off the charger.

At the end of each subsequent long period the programmer unit 13 delivers a 1 to the second input of the gate 12 and switches the charging current on, and at the end of each subsequent short period, it delivers a 0 thereto and switches the charging current off. This continues until the charger is manually switched off or the battery is disconnected.

The programmer unit 13 is supplied with pulses from an alternating current supply at 50 hertz and comprises a counter 14 acting as a frequency divider and a second counter 15 forming the programmer. The counter 14 acting as a frequency divider can be switched at will to operate in either of two modes giving clock output pulses at two different frequencies.

The clock input of the frequency divider counter 14 is connected to the alternating current supply so as to receive clock pulses at a frequency of 50 hertz. The ninth, tenth and eleventh binary digital outputs are connected to three of the inputs of a 'ten hour' AND gate 16 while the tenth and twelfth binary digital outputs are connected to two inputs of a '14½ hour' AND gate 17. A further input of the AND gate 16 is connected through a resistor 18 to the positive supply and through a switch 19 to the negative supply terminal. An additional input of the AND gate 17 is connected through an inverter 20 to the same point. The outputs of the two AND gates 16 and 17 are connected respectively to the inputs of a NOR gate 21 of which the output is connected to one input of a NAND gate 22 of which the other input is connected to an initial zero resetting connection in the charger. The output of this AND gate 22 is connected to the clock input of the programmer counter 15 and to the reset input of the frequency divider counter 14.

Accordingly the operation of the frequency divider counter is as follows:

When the manual switch 19 is closed it places a 0 on one input of the '10 hour' AND gate 16 thereby locking the output of this gate at 0 while, owing to the inverter 20, it places a 1 on one of the inputs of the '14½ hour' AND gate 17 permitting this gate to produce a 1 if all the other inputs are 1's. Conversely when the switch 19 is open the '10 hour' AND gate 16 is operative and the '14½ hour' AND gate 17 is locked to a 0 output. Whenever one of these gates produces a 1 output the NOR gate 21 will respond by giving a 0 output and the ensuing AND gate 22 will give a positive output to the reset input of the frequency divider counter 14 thereby terminating the output so that a short clock pulse is delivered to the programmer counter 15.

Accordingly the programmer counter 15 will receive clock pulses at either of two frequencies at the choice of the user. If the switch 19 is closed for the 14½ hour mode the '14½ hour' AND gate 17 will be operative and give an output, and hence a clock pulse to the programmer counter 15, when the tenth and twelfth binary count outputs are at 1, representing a binary figure of 101000000000 representing a decimal count of 2,560 cycles at 50 hertz that is to say 51.2 seconds. On the other hand, when the switch 19 is open the '10 hour' AND gate 16 will be operative and give a clock pulse when the ninth, tenth and eleventh binary count outputs are at 1 representing a binary figure of 011100000000 or 1,792 cycles at 50 hertz representing a period of 35.84 seconds.

The programmer counter 15 has its seventh, eighth, ninth and tenth binary count outputs connected through an AND gate 23 to the 'set' input of the latch mechanism described above. Accordingly this gate will provide an output 1 starting at a count of 1111000000 in binary notation or 960 in decimal notation. Thus with the switch 19 in the closed position it will deliver a pulse after 960 counts of 51.2 seconds, that is, 13.65 hours. The output will remain at 1 so long as the count outputs 7, 8, 9 and 10 remain at 1, that is to say until the count resets to 0000000000 after reaching a figure of 1111111111. This represents an additional count of 0001000000 in binary notation or 64 in decimal notation. With the switch 19 in the closed 14½ hour position this represents 64 × 51.2 seconds or 55 minutes. Thus the period before the output reverts to a nought is 13.65 hours plus 55 minutes or roughly 14½ hours.

Similarly with the switch 19 in the open 10 hours position and AND gate 23 gives a 1 output for 960 × 35.84 seconds or 9.56 hours and returns to the nought output after a further 64 × 35.84 seconds, that is to say 38 minutes. Hence the initial period before the output of the AND gate 23 returns to zero is about 10 hours.

The programmer unit 13 continues to deliver a 1 output for long periods of about 13½ hours alternating with a zero output for short periods of about 55 minutes indefinitely, assuming the switch 19 is in the closed position, and similarly to deliver alternate long periods of about 9½ hours and short periods of about 38 minutes with the switch 19 in the open position.

The output of the NOR gate 12 of the latching network is connected to the charger through a further NOR gate 24 having a further input connected through a second cross connected NOR gate latch 25 to the eighth binary count output of the frequency dividing counter 14. The latch 25 is reset initially by the pulse which also resets the counter 15 and the latch 10, 11, when the charger is first switched on. While the eighth count output remains at zero the latch 25 has a 1 output to the NOR gate 24 thereby locking its output at zero. When the eighth count output changes to a 1, after about 2½ seconds from switching on, it switches the output of the latch 25 to zero, allowing charging to start.

The supervisory control described may also be applied to a charger as described in U.S. Pat. No. 3,979,658. The relevant parts of the circuit of that charger are shown in the drawing.

That charger incorporates an interval timing counter 26 supplied with clock pulses at regular intervals and arranged to stop the charging current when it reaches a predetermined count, specifically at a 1 on the eleventh binary count output. This counter 26 is supplied with clock pulses (specifically at intervals of the order of one second) but has a reset input controlled by the stepping of a staircase counter 27.

The output of a comparator 28 comparing a signal dependent on battery voltage with a staircase reference voltage is connected to the reset input of a step up counter 29 to hold it at zero so long as the battery voltage signal is less than the reference signal, but allow it to count clock signals if the battery voltage signal exceeds the reference voltage signal. A given count output of the step up counter 29 (specifically a 1 on the seventh binary count output) is applied to the staircase counter 27 with which is associated a binary weighted resistance network which produces the reference voltage signal. Stepping of the staircase counter 27 raises the reference signal by a step. This normally switches the comparator 28 and resets the step up counter 29 and at the same time the seventh binary output is connected through an inverter 30 and a NAND gate 31 to the reset input of the interval timing counter 26.

Hence the charging current is switched off if the interval between steps of the staircase counter 27 exceeds 44 minutes, so that the timing counter 26 reaches the predetermined count before being reset.

In applying the present invention to such a charger means is provided to switch the charging current on again.

The charging current is controlled by a contactor (not shown) which in turn is controlled by a light amplifier (a light-emitting diode controlling a light-activated thyristor). The light-emitting diode, shown at 32, is connected in series with the output stage of a transistor amplifier 33 controlled by the NOR gate 24 in the supervisory circuit, and a small thyristor 34 controlled by the interval timing counter 26. Both of the latter must conduct to permit charging current to flow.

For this purpose the supervisory circuit in accordance with the present invention also includes a capacitor-resistor network 35 connected to the output of the third NOR gate 12 of the latch network to supply a negative spike to one input of the NAND gate 31 to reset the interval timing counter 26 at the start of each short period and allow charging to be resumed.

The power supply to the amplifier 33 and thyristor is obtained by rectifying an a.c. supply, but is not smoothed, so that the thyristor 34 can turn off between half-cycles.

What I claim as my invention and desire to secure by Letters Patent is:

1. Apparatus for supervising the switching off of an electric battery charger and providing a topping-up charge, comprising a clock programmer giving digital signals on an output thereof for long periods and short periods alternately, a bistable latch having set and reset inputs, of which the set input is connected to the programmer output to force the latch into its set condition during the said short periods, an initial reset signal source, the reset input is connected to the initial reset signal source, a gate connected to be controlled by the programmer output and by the latch for controlling the switching on and off of charging current, the gate switching on the charging current when either the latch is in its reset condition or the programmer is providing a set signal to the latch, so that the said charging current is allowed to be switched on, because the latch is reset, during a first long period at the end of which the latch is set, without switching off the charging current until the end of the ensuing short period, and at the end of each subsequent long period the charging current is switched on again, and at the end of each subsequent short period the charging current is switched off again.

2. Apparatus as claimed in claim 1 in which the programmer comprises a binary digital counter connected to a source of clock pulses and including an AND gate arrangement with inputs connected to a number of selected consecutive count outputs of the counter and the AND gate output connected to provide the programmer output, the programmer output is switched on at the end of a long period when the counter reaches a one count on all the selected outputs with zero on all lower outputs, and the programmer output is switched off at the end of an ensuing short period, and subsequent to the said lower outputs as well as the selected outputs reaching a one count, the programmer output resets all the selected outputs and the lower outputs to zero, thereafter repeating similar long and short intervals.

3. Apparatus as claimed in claim 2 further comprising a frequency divider including a binary digital counter giving an output and resetting itself when it reaches a predetermined count for generating clock pulses, an alternating power source for actuating said frequency divider, said clock pulses being input to the programmer binary counter.

4. Apparatus as claimed in claim 3 further comprising switching means for altering the count of the frequency divider counter at which it supplies a clock pulse to the programmer counter and resets itself.

5. Apparatus as claimed in claim 4 further comprising a pair of AND gates each having one or more inputs connected to count outputs of the frequency divider counter and an input connected to a switch circuit, the latter input of one AND gate of the pair of AND gates being connected directly to the switch circuit and the latter input of the other AND gate of the pair of AND gates is connected thereto through an inverter so that with the switch in one position one AND gate of the pair of AND gates is enabled and the other AND gate of the pair of AND gates is inhibited and vice-versa.

6. Apparatus as claimed in claim 5 further comprising a NOR gate and in which the outputs of the pair of AND gates are connected to the clock input of the programmer counter through said NOR gate.

7. Apparatus as claimed in claim 1 in which the bistable latch comprises a cross connected pair of inverting gates.

8. Apparatus as claimed in claim 7 in which at least one of the inverting gates is a NOR gate.

9. Apparatus as claimed in claim 7 in which at least one of the inverting gates is a NAND gate.

10. Apparatus as in claim 8 in which at least one of the inverting gates is a NAND gate.

* * * * *